United States Patent Office 3,311,264
Patented Mar. 28, 1967

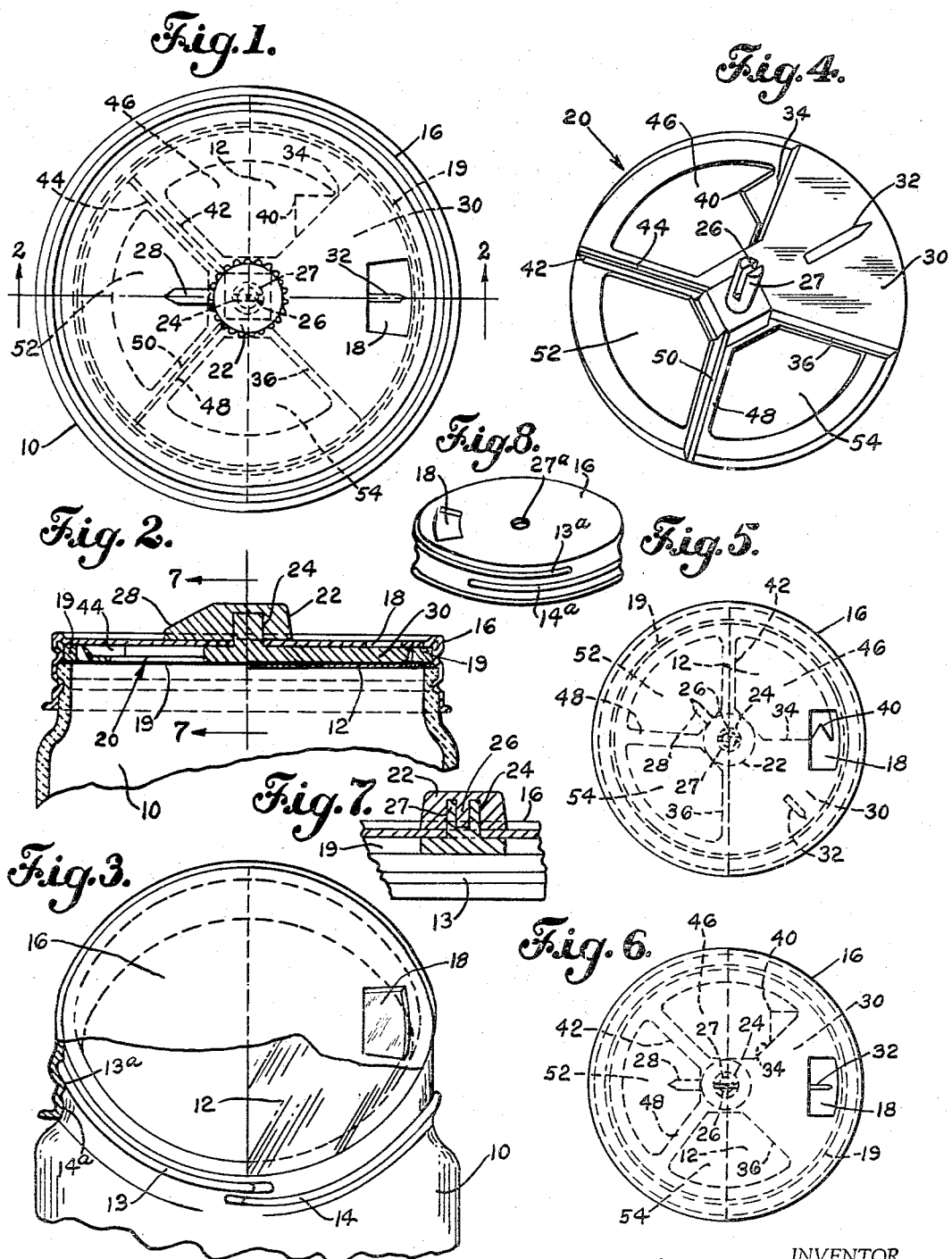

3,311,264
MEASURING AND DISPENSING DEVICE
Arthur W. Cayer, 23½ Jackson St.,
Taunton, Mass. 02780
Filed Dec. 14, 1964, Ser. No. 418,240
9 Claims. (Cl. 222—25)

This invention relates to a device to measure and dispense material such as powdered coffee, sugar and the like.

One object of my invention is to provide such a device that utilizes the usual cover for a container, even though a shallow one, thus avoiding the need of a special cover as a substitute for that which accompanies a container that is commercially sold.

Another object is to provide such a device that serves, using a simple valve, to dispense either a predetermined, maximum amount of material desired or a predetermined minimum amount, by merely changing the dispensing position of the container.

A further object is to provide such a device that, by a simple movement of a valve, will be in another starting position, ready to dispense another predetermined amount of material that is between said other two amounts in quantity.

A still further object is to provide such a device that is relatively low in cost and simple in operation.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

In the drawing:

FIG. 1 is a top plan view of the cover and valve of my measuring and dispensing device.

FIG. 2 is a sectional view taken on the line 2—2 of FIG. 1.

FIG. 3 is a fragmentary, perspective view of a container with sealing member with cover therefor for my device.

FIG. 4 is a perspective top view of the dispenser valve of my device.

FIG. 5 is a plan view on a reduced scale, looking on the outside of the cover showing the dispenser valve in starting position with relation to said cover, ready for movement to dispense an intermediate quantity, or a rounded teaspoonful of coffee or other material.

FIG. 6 is a plan view similar to FIG. 5; but showing the dispenser valve in its finished position after dispensing a predetermined, but different quantity of said material, which is also starting position ready for the next dispensing movement.

FIG. 7 is a sectional view taken on the line 7—7 of FIG. 2.

FIG. 8 is a perspective view on a reduced scale, of the cover for the container.

As illustrated, a container 10, which may be the usual jar suitable for containing coffee powder or sugar or other material, has a semi-circular obstruction or sealing member 12, closing one-half of its mouth. At the upper exterior of said container 10 is an upper projecting thread portion 13 and an integral lower projecting thread portion 14, shown terminating at a point adjacent each other. A screw-threaded cover or cap 16, such as is commonly used, has integral upper and lower thread portions 13a and 14a that respectively connect with said container thread portions 13 and 14 in the usual way. Said cover 16 has a small discharge opening 18 therethrough adjacent the outer rim which is located over sealing member 12. A ring or washer 19 inside said cover 16 at the periphery thereof prevents the cover from being screwed onto the container too far. This washer 19 serves as a spacer and also a filler at the outer edge of a dispensing valve 20, later described, that keeps material from collecting and interfering with rotation of said valve.

Within said cover 16 is a dispensing valve 20 that is rotatably connected thereto by a handle member or knob 22 having a recess 24 surrounding a tongue 26. An actuating member shown as a slotted stud portion 27 is integral with said valve 20 and it enters said recess 24 in a press fit after passing through a hole 27a in said cover 16. Said knob 22 has an indicator 28 that extends laterally to indicate the position of said valve 20 on said cover 16, and particularly with relation to said opening 18.

Said valve 20 has a solid or closure portion 30 on the outer face of which, near the periphery, is a guide or sunken indicator line 32 that is visible through said discharge opening 18 when the valve is rotated to a predetermined position. At opposite sides of said closure portion 30, where the side edges terminate, pusher members 34 and 36 are provided as shown in said FIG. 4, for instance, and which are inset, leaving small spaces between the side extremities of said closure portion and said cover 16. Extending laterally beyond and carried by the main body of said closure portion 30 is a projecting indicator 40 later referred to.

Beyond said closure portion 30 a flat partition or divider 42 extends radially and overlies an integral rib or thin pusher member 44 that is close to, or makes light contact with, the inner surface of said cover 16 as shown in said FIG. 2. A space or receiver opening 46 is provided between said divider 42 and said pusher member 34. Another partition or divider 48 similar to and spaced from said divider 42, has a rib or thin pusher member 50 similar to pusher member 44. This divider 48 sets off or provides a space or receiver opening 54 between divider 48 and said pusher member 36.

When my cover 16 is screwed onto said container 10, said valve 20 is rotated until said indicator line 32 is visible through said discharge opening 18 as shown in FIGS. 1 and 6. In that position receiver opening 52 between dividers 42 and 48 is entirely away from said sealing member 12 and said openings 46 and 54 are partly away from said sealing member 12 and partly opposite it. Upon turning the container upside down, that is, to loading position, material falls into said receiver openings 52, 46 and 54. Some will pass into the portions of said openings 46 and 54 that are opposite or covered by said sealing member 12, and also under said dividers 42 and 48 that overhang said pusher members 44 and 50.

The valve 20 is rotated a full turn from the position shown in said FIG. 6 while holding the container in an inverted vertical position. During this rotation the material that is in said three receiver openings 52, 46 and 54, and is uncovered or unobstructed, will be pushed along by said pusher members 44 and 50 and either 34 or 36, which one of the latter two depending upon which direction the valve 20 is rotated. As the material reaches said discharge opening 18 it will pass out. There will be sufficient material discharged to fill a level teaspoonful if the valve 20 is of the size and formation shown in said FIG. 4. In any event a comparatively small quantity will be discharged, since the material in said openings 52, 46 and 54 that is obstructed by said closure portion 30 and said dividers 42 and 48 will not pass out when the container is held fully upright.

The same said starting and finishing point, and valve movement, are used to dispense a heaping teaspoonful or the largest quantity; but the container is held in diagonal, discharging position of about 45 degrees relative to a table top or other horizontal surface. When held in this position the obstructed materials in said openings 46 and 54, that are under said sealing member 12, as well as under said dividers 42 and 48, will pour out and into said discharge opening 18.

It would be possible, in dispensing either of the above quantities to have one continuous opening between one edge of said closure portion 30 and the opposite edge, since either of said pusher members 34 or 36 alone could move the material to said discharge opening 18. The valve 20 may be rotated in either direction to discharge said materials.

Said indicator 28 always points in a directly opposite direction away from said indicator line 32, as when the latter is opposite said opening 18 as shown in said FIG. 1, hence when the valve 20 has completed its said 360-degree movement the user can tell by the feel of said indicator 28 that it is directly across said opening 18, hence the above described valve movement is complete and should terminate. If another said measured quantity of material is to be dispensed said valve 20 is then at the starting point and ready for the next dispensing movement.

When a rounded teaspoonful of material, for instance, which is less than a heaping teaspoonful and more than a level teaspoonful, is to be discharged, said valve 20 is rotated until said indicator 40 registers with said discharge opening 18 as shown in said FIG. 5. In this position only two of the openings, 52 and 54 will be unobstructed, while opening 46 will be wholly obstructed by said cover sealing member 12. Therefore, when the container is inverted, only said openings 52 and 54 will receive the material. It is held in diagonal position as above explained. The valve is rotated until said indicator line 32 is opposite said discharge opening 18, as shown in said FIG. 6, at which point the contents of said openings 52 and 54 will have been discharged. Less than one complete rotation will have occurred, and a rounded teaspoonful of material will have passed into a receptacle receiving it. More than one pusher member is desirable since material will be more easily moved and discharged when more than one is provided.

What I claim is:

1. A dispensing valve in combination with a circular cover for a container, said cover having a top and a side, actuating means centrally located on and extending outside said cover and rotatably connecting said valve to said cover, said cover having a discharge opening adjacent the periphery thereof and spaced from said means peripherally outward, said valve embodying a closure portion having a pusher member adjacent a side extremity thereof and extending towards said cover top and having an open portion next to said closure portion that is greater in area than and that registers with said discharge opening in discharging position, said cover discharge opening being in the path of circumferential movement of said pusher member, said open portion and said pusher member extending radially inward to said actuating means.

2. A dispensing valve in combination with a circular cover for a container as set forth in claim 1, and a container having a circular mouth, and a fixed sealing member on said container partially closing only part of said mouth.

3. A dispensing valve in combination with a circular cover for a container as set forth in claim 2, said sealing member closing one-half of said mouth and extending from the center point of said mouth to the side of said container.

4. A dispensing valve in combination with a circular cover for a container as set forth in claim 1, said closure portion having an indicator at a circumferential side extremity thereof so positioned as to register with said discharge opening in predetermined position.

5. A dispensing valve in combination with a circular cover for a container as set forth in claim 1, and a first divider having a pusher member intermediate opposite sides of said divider and spaced circumferentially from said closure portion and extending to a point adjacent said cover top, said first divider extending radially inward to said actuating means.

6. A dispensing valve in combination with a circular cover for a container as set forth in claim 5, and another divider spaced circumferentially from said first divider and having a pusher member extending towards and adjacent to said cover top from an intermediate portion of said divider, said other divider extending radially inward to said actuating means.

7. A dispensing valve in combination with a circular cover for a container as set forth in claim 5, and another pusher member spaced circumferentially from said two pusher members, and an indicator carried by and projecting circumferentially from said closure portion and so positioned as to extend directly opposite said discharge opening when said valve is moved to a predetermined position.

8. In combination, a container, a cover therefor and a dispensing valve, said cover having a discharge opening, means rotatably connecting said valve to said cover, said container having a sealing member partially closing the mouth thereof, said valve having a closure portion and an opening laterally of said closure portion, said closure portion having an indicator adapted to register with said cover discharge opening when in predetermined position, said closure portion being directly opposite said sealing member when said closure portion indicator is in said predetermined position, a washer within said cover at the inner periphery thereof adapted to contact the upper edge of said container when said cover is in position of use on said container, said valve being spaced from said sealing member whereby said valve may freely rotate relative to said sealing member.

9. In combination, a container, a cover therefor and a dispensing valve as set forth in claim 8, said valve being peripherally inward of said washer and spaced laterally therefrom and being adapted to freely rotate relative to said washer.

References Cited by the Examiner

UNITED STATES PATENTS

| 2,032,763 | 3/1936 | Mostkoff | 222—362 X |
| 2,191,928 | 2/1940 | McVicker | 222—362 X |
| 2,543,934 | 3/1951 | Poskey | 222—370 |
| 2,579,388 | 12/1951 | Lowry | 222—42 |
| 2,898,010 | 8/1959 | Tepper | 222—370 X |
| 3,007,612 | 11/1961 | Tepper | 222—362 X |
| 3,207,371 | 9/1965 | Stone | 222—48 |

FOREIGN PATENTS

| 28,530 | 7/1931 | Australia. |
| 595,071 | 3/1960 | Canada. |
| 598,847 | 10/1959 | Italy. |

ROBERT B. REEVES, *Primary Examiner.*

CHARLES R. CARTER, *Examiner.*

K. N. LEIMER, *Assistant Examiner.*